US 6,546,886 B2

(12) United States Patent  
Burg

(10) Patent No.: US 6,546,886 B2
(45) Date of Patent: Apr. 15, 2003

(54) AIR ASSISTED SHIP

(75) Inventor: Donald E. Burg, Miami, FL (US)

(73) Assignee: Paulette Renee Burg, Miami, FL (US)

(*) Notice: Subject to any disclaimer, the term of this patent is extended or adjusted under 35 U.S.C. 154(b) by 0 days.

(21) Appl. No.: 09/865,751

(22) Filed: May 25, 2001

(65) Prior Publication Data

US 2001/0035117 A1 Nov. 1, 2001

Related U.S. Application Data

(63) Continuation-in-part of application No. 09/337,300, filed on Jun. 21, 1999, now abandoned, and a continuation-in-part of application No. 09/299,865, filed on Apr. 26, 1999, now abandoned, and a continuation-in-part of application No. 09/197,894, filed on Nov. 23, 1998, now Pat. No. 6,199,496, and a continuation-in-part of application No. 08/850,979, filed on May 5, 1997, now Pat. No. 5,934,215, and a continuation-in-part of application No. 08/823,891, filed on Mar. 17, 1997, now Pat. No. 5,839,384, and a continuation-in-part of application No. 08/483,791, filed on Jun. 7, 1995, now Pat. No. 5,626,669, and a continuation-in-part of application No. 08/468,876, filed on Jun. 6, 1995, now Pat. No. 5,611,294.

(51) Int. Cl.[7] ............................... B63B 1/34; B63B 1/20
(52) U.S. Cl. .................. 114/67 A; 114/272; 114/273; 114/290
(58) Field of Search ................... 114/67 A, 288–290, 114/272, 273

(56) References Cited

U.S. PATENT DOCUMENTS

| 1,307,135 | A | * | 6/1919 | Lake | 114/289 |
| 2,343,645 | A | * | 3/1944 | Dickinson et al. | 244/106 |
| 3,077,321 | A | * | 2/1963 | Dunham | 114/67 A |
| 3,082,976 | A | * | 3/1963 | Dornier | 114/67 A |
| 3,918,382 | A | * | 11/1975 | Austin | 114/273 |
| 4,348,195 | A | * | 9/1982 | Lantz | 440/100 |
| 5,611,294 | A | * | 3/1997 | Burg | 114/272 |

* cited by examiner

Primary Examiner—Sherman Basinger
(74) Attorney, Agent, or Firm—Robert J. Van Der Wall

(57) ABSTRACT

An improved marine vehicle that offers very high efficiencies made possible by pressurized gas cushion(s) disposed between its hull(s) and a water surface is presented. The gas cushion(s), in the ideal arrangement, is supplied with pressurized gas by a powered blower that obtains at least part of its inlet gas flow from an opening(s) in upper surfaces of a wing shaped cabin structure. In an optional arrangement, gas supply to a propulsion system engine can be obtained from similar opening(s). A secondary wing may be placed above the main wing to help direct airflow over the upper surfaces of the main wing. A gas cushion seal is provided that has the ability to control gas flow and thereby reduce blower power requirements. Further, steps may be inset into the sides of the hull(s) that reduce drag in rough seas but yet are protected by hull chines when the hull is transitioning into planing mode.

50 Claims, 11 Drawing Sheets

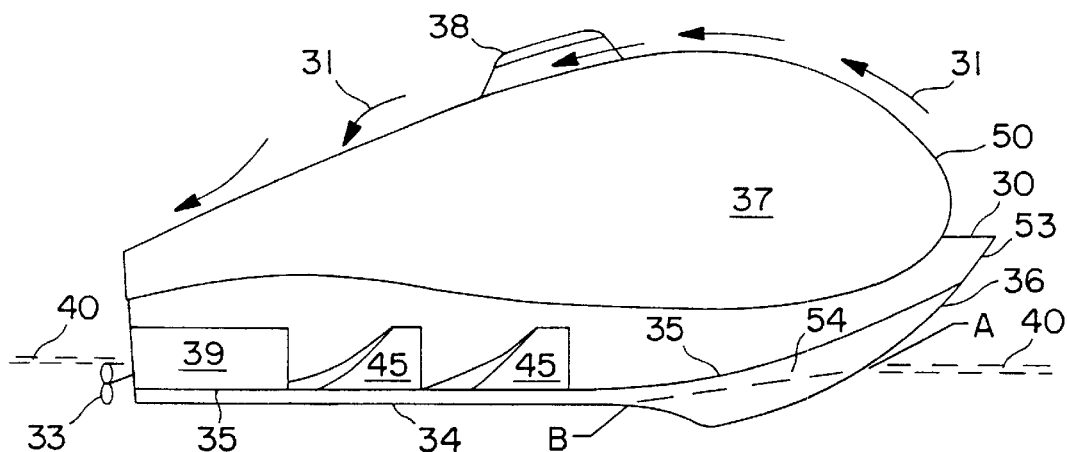
FIG. 2
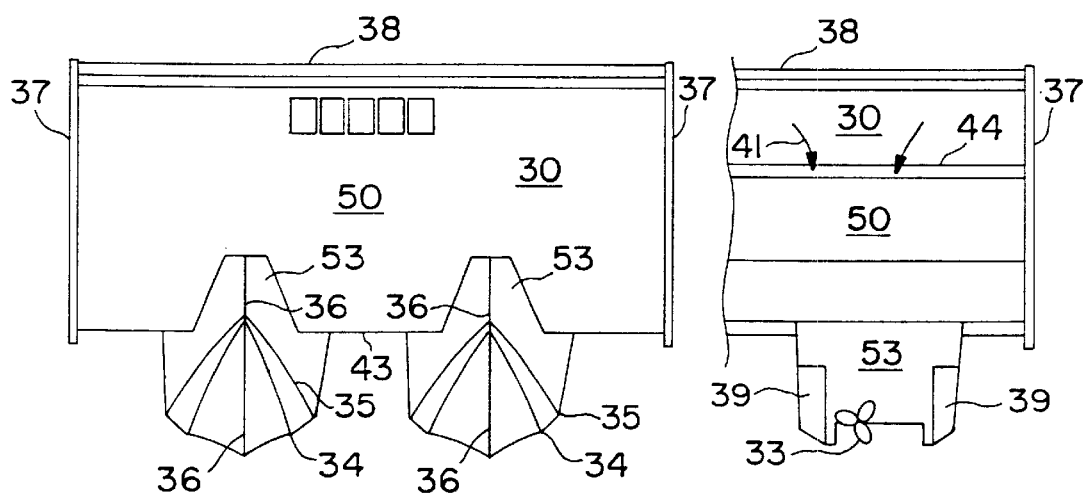
FIG. 3
FIG. 4

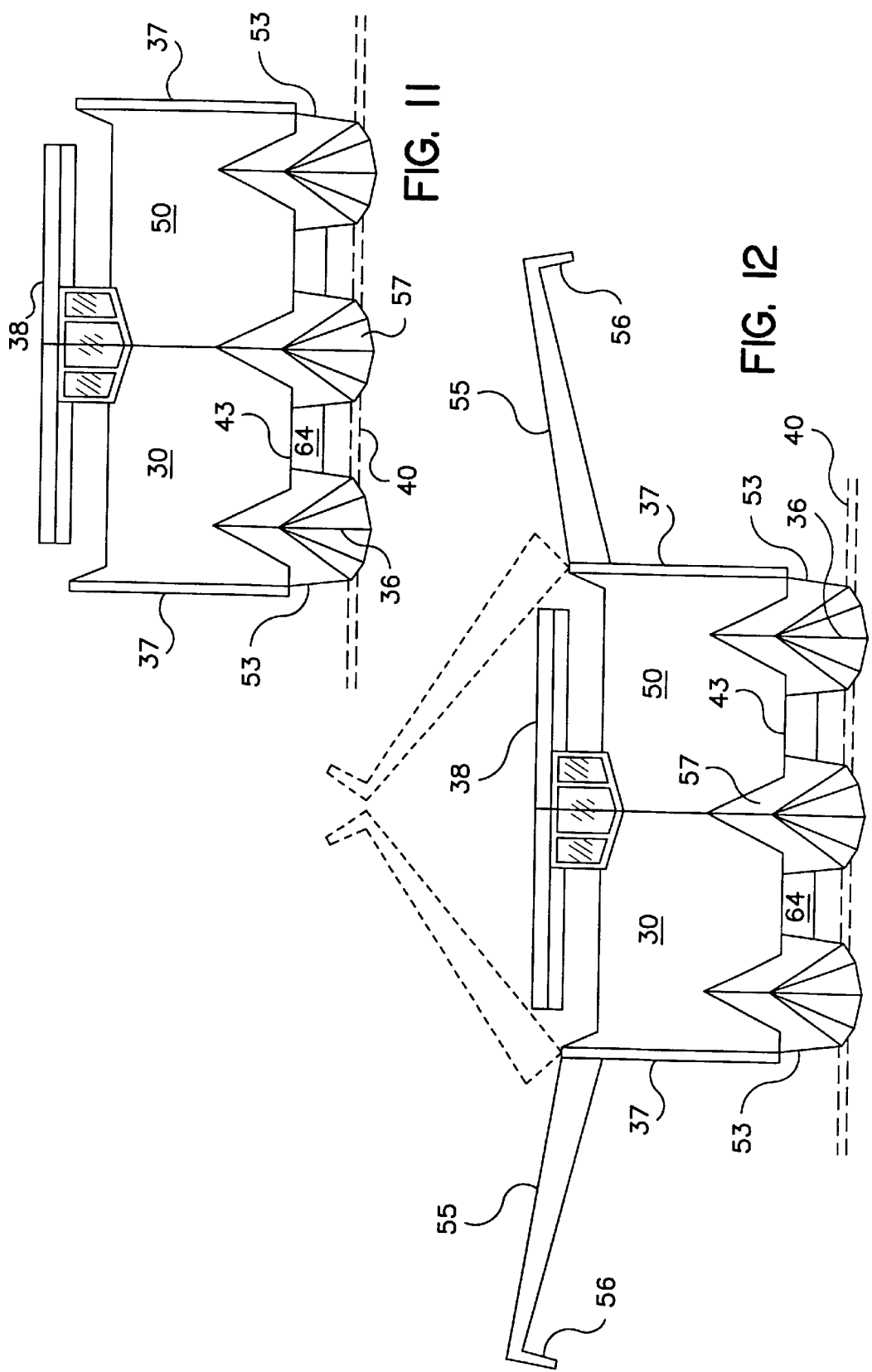

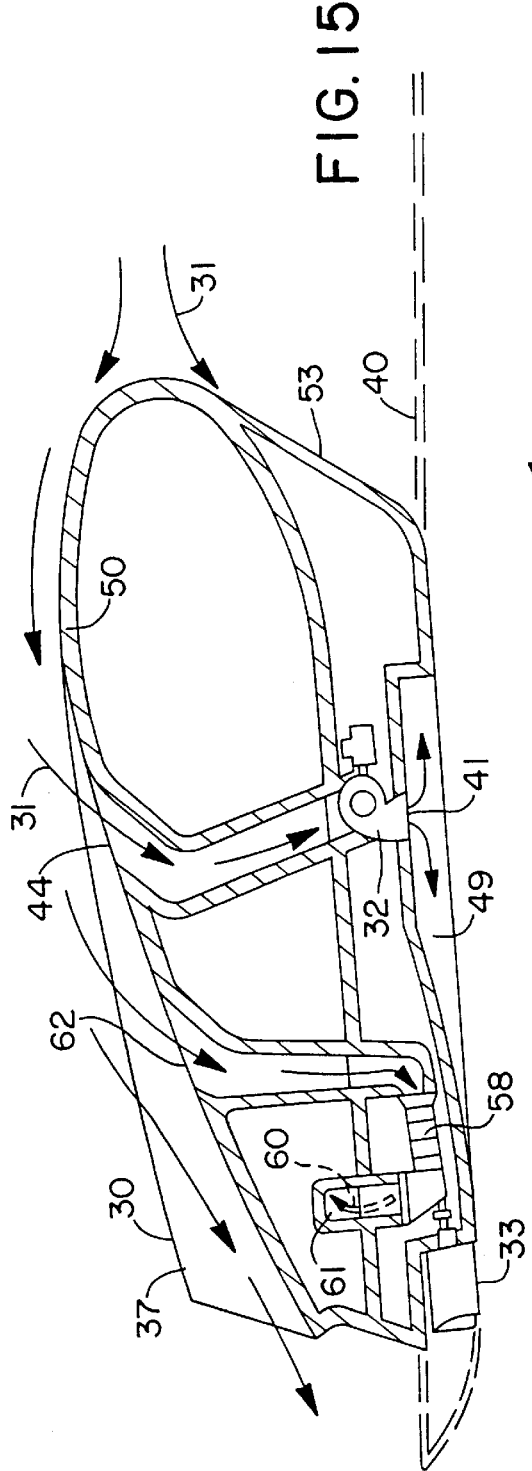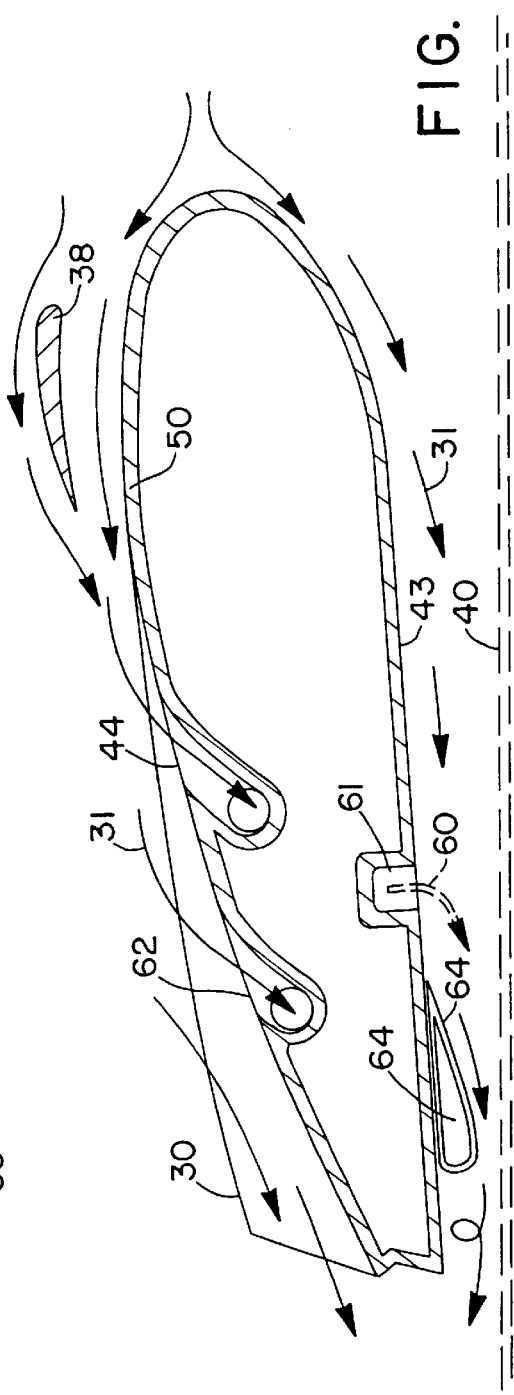

AIR ASSISTED SHIP

CROSS REFERENCE TO OTHER APPLICATIONS

This application is continuation-in-part of Ser. No. 08/468,876 filed Jun. 6, 1995 now U.S. Pat. No. 5,611,294, a continuation-in-part of Ser. No. 08/483,791 flied Jun. 7, 1995 now U.S. Pat. No. 5,626,669, a continuation-in-part of Ser. No. 08/823,891 filed Mar. 17, 1997 now U.S. Pat. No. 5,839,384, a continuation-in-part of Ser. No. 08/850,979 filed May 5, 1997 now U.S. Pat. No. 5,934,215, a continuation-in-part of Ser. No. 09/197,894 filed Nov. 23, 1998 now U.S. Pat. No. 6,199,496, a continuation-in-part of Ser. No. 09/299,865 filed Apr. 26, 1999 now abandoned, and a continuation-in-part of Ser. No. 09/337,300 filed Jun. 21, 1999 now abandoned.

BACKGROUND AND FIELD OF THE INVENTION

The instant invention describes an improved marine vehicle or ship that has substantial efficiency advantages compared to other marine vehicles. In its preferred embodiment, it offers the high efficiencies of marine vehicles that are partially supported by blower fan supplied pressurized gas cushion(s) that are disposed between the marine vehicle and the water surface. Examples of gas cushioned craft are the hovercraft or Surface Effect Ship (SES). Examples of such a gas-cushioned craft are given in applicant's U.S. Pat. Nos. 5,611,294 and 5,626,669.

The improved marine vehicle also has means to create a great enhancement of its aerodynamic lift by increasing lift over a preferably at least partially airfoil shaped upper surface of the improved marine vehicle. This is enhanced by drawing air into a portion of said upper surface to in effect create a boundary layer control system. It is offered that the preferred source of power for the boundary layer control system is air used to supply the inlet air to the blower supplying gas to the gas cushion(s). Optional sources of power for the boundary layer control system include air directed to the propulsion system engine(s) and/or air to the propulsor itself. It is also possible to use a flow deflector to direct and accelerate airflow over the upper surface of the vehicle.

There are vehicles that have a wing that operates close to the water or ground surface thereby increasing their lifting efficiency at cruise speeds by compressing the air under the wing to create a water or ground effect. These are sometimes called Wingships. Some of applicant's patents that describe versions of Wingships are U.S. Pat. Nos. 5,611,294 and 5,626,669. The Wingship can actually transition from a waterborne to an airborne mode of operation. Wingships normally have relatively thin wings like aircraft for low drag coefficients when airborne. Ideally speaking however, a wing with the highest coefficient of lift would have a large radius leading edge and a very thick shape. It would also have a high camber in its most desired embodiment. Its shape requires that the air passing over the upper surface of the wing travel significantly further and hence faster than the air traveling over the upper surface of a thinner wing as used on aircraft. By Bernoulli's equations this results in a lower static head or pressure on the top of the instant invention's thick section wing and hence a much higher coefficient of lift compared to a thin section aircraft style wing. However, in the process of doing this there is, as speed increases, a separation of airflow from the top of the thick section wing. The main body of the instant invention uses a thick section wing but applies means to overcome the flow separation problem. It does this by means of: 1) Boundary layer bleeds, 2) Flow augmentation means, and/or 3) Flow directing vanes. As a result, it offers coefficients of lift that are about twice that of state of the art thin section wings used on aircraft. The instant invention's thick section wings still realize the significant benefits of ground effect lift on their undersides as they operate close to the water surface. There have been studies of thick section wings that use boundary layer bleeds or flow augmenting means with published results showing better than a two times lift coefficient improvement compared to thin section wings. A discussion of the performance of such a thick section wing is given on pages 232 and 233 of "Theory of Wing Sections" by Ira H. Abbott and Albert E. Van Doenhoff as published by Dover Publications, Inc., New York, N.Y., copyright 1959, Library of Congress No: 60–1601. There appears to have been no practical application to today's higher speed aircraft since the frontal profile area of the thick section wings created excessive drag at high speeds plus, importantly, it was deemed too expensive and weighty to incorporate and drive the necessary blower fans to either bleed off and redirect the boundary layer or supplement it with large volumes of gas flow. Applicant addresses these problems by: 1) Operating at relatively low marine vehicle speeds and 2) Utilizing the tremendous volumes of air flow required by the large blower fans that supply the pressurized gas cushions of the SES or hovercraft and/or the air required by gas turbines used for propulsion power and/or air directed to the inlets of propulsors to bleed off gas flowing over the upper surfaces of a thick section wing.

The instant invention offers further means to improve performance that offer much advantage. A few of these improvements include: 1) A transversely oriented curvilinear upper surface shape to the gas cushion recess(es) in the hull(s) that acts to add considerable structural strength to the hull as well as to reduce displacement when the blowers are off, 2) A novel aft seal for the recess that reduces leakage from the gas cushion, 3) Water friction reducing steps set into the sides of the hull(s) that are unique in that they are inset behind a chine which improves performance when the marine vehicle is getting onto plane as well as when operating at speed in rough seas, 4) Optional, preferably retractable, sidewings that, while lightweight in construction, offer considerable aerodynamic efficiency advantages, and 5) The ability to transition to wing in ground effect flight at least mostly free of the water when an air propulsor rather than a water propulsor is installed.

There are further improvements over the previous art that will become apparent upon examination of the remainder of this application.

SUMMARY OF THE INVENTION

The primary object of the instant invention is to provide a superior high efficiency marine vehicle that includes a boat hull where said boat hull has means to restrain an artificially pressurized gas cushion between the boat hull and a water surface.

It is a directly related object of the invention that a means to artificially pressurize the gas cushion can take the form of a powered blower fan, engine exhaust, or other gas pressurizing means.

It is another object of the invention that said artificially pressurized gas cushion is at least in part restrained by a recess built into an underside of the boat hull.

It is an object of the invention that one or more of its multiple hulls can include the air cushion recess(es) that are pressurized with gas and that one or more of its multiple hulls do not have the gas cushion recess(es).

It is a related object of the invention that said gas cushion recess, in its optimum configuration, converges going forward over at least a portion of its length.

It is another related object of the invention that the gas cushion recess is bordered, at least partially, by recess sidekeels where at least one of said sidekeels converges toward the other over at least a portion of its length going from aft to forward.

It is a directly related object of the invention that a distance from where said sidekeels begin converging going forward to a forward portion of the boat hull that is in water contact, as seem in a calm sea surface waterline when the recess(es) are not pressurized with gas, extends over at least twenty-five percent of a waterline length of said boat hull.

It a further directly related object of the invention that from where said sidekeels begin converging going forward to a forward portion of the boat hull that is in water contact there is formed an included angle of less than twenty-six degrees.

It is yet another object of the invention that gas cushion recess(es) can have curvilinear upper surfaces as seen in a transverse plane of the hull to greatly add strength to the hull and to reduce draft when the gas cushion is not pressurized.

It is a further object of the invention that a transversely oriented gas cushion recess seal can include a step seal.

It is a directly related object of the invention that the step seal can be vented or pressurized to thereby aid in its sealing effectiveness.

It is still another object of the invention that water-deflecting steps can be inset into sides of the hull(s).

It is a directly related object of the invention that the water deflecting steps can be inset above a chine of the hull(s) to thereby reduce or eliminate their water contact when the marine vehicle is coming on plane while also reducing water contact in rough seas when the vehicle is operating at high speeds.

It is a further object of the invention that it can utilize aerodynamic lift to augment its performance.

It is a related object of the invention that at least a portion of the aerodynamic lift is obtained from air flowing over an upper surface of the marine vehicle and thereby creating a reduced static pressure on said upper surface.

It is another object of the invention that aerodynamic lift is, at least in part, generated by air flowing over a structure that is at least partially in the form of a thick section wing.

It is an object of the invention that the thick section wing, also referred to as the first wing or main wing, be in mechanical communication with the boat hull.

It is another object of the invention that there be a means to bleed off gas flowing over upper surfaces of the first wing as a form of boundary layer control.

It is a directly related object of the invention that the means to bleed off gas flowing over upper surfaces of the first wing can include devices such as blower fan(s) or engine(s) where the engine(s) is using the bleed off gas for at least part of its required gas inlet flow.

It is a further object of the invention that gas can be supplied to an upper surface of the first wing by means of powered blower fan(s), engine exhaust, or other gas pressurizing means.

It is a related object of the invention that a propulsion system engine can bleed off part of the gas flowing over the upper surfaces of the first wing for use as engine inlet gas and supply its exhaust gas to an upper surface of the first wing.

It is yet another object of the invention that an air propulsor can be utilized to provide propulsive thrust.

It is a directly related object of the invention that such an air propulsor can take its inlet air from upper surfaces of the first or main wing.

It is yet another object of the invention that a second wing can be disposed, at least in its majority, above the first wing with said second wing used to aid in flow control over the first wing.

It is another object of the invention that the first wing can have sideplates proximal either end of its span.

It is a further object of the invention that the first wing can include a fore to aft oriented bisecting structural member.

It is yet another object of the invention that a majority of payload of the inventive marine vehicle can be carried internal to the first or main wing.

It is another object of the invention that it can include port and starboard sidewings where such sidewings can provide ground effect lift when the vehicle is moving forward.

It is a directly related object of the invention that the sidewings can include winglets proximal their outer ends.

It is another related object of the invention that the sidewings are retractable.

It is a further object of the invention that the subject marine vehicle be capable of transition to airborne flight.

It is yet another object of the invention that a moveable, in relation to the instant invention marine vehicle, seal be disposed on the underside of the main wing.

It is a directly related object of the invention that the movable seal be flexible in nature.

It is a further directly related object of the invention that the movable seal can be inflated with pressurized gas.

The invention will be better understood upon reference to the drawings and the detailed description of the invention which follow in which:

BRIEF DESCRIPTION OF THE DRAWINGS

FIG. 2 is a profile view of the instant invention improved marine vehicle.

FIG. 3 gives a bow view of that in this case offers two hulls supporting a connecting structure in a catamaran arrangement. The number of hulls used can vary from one to many.

FIG. 4 is a partial stem view of the instant invention improved marine vehicle.

FIG. 11 gives a bow on view of the version of the instant invention presented in FIG. 10.

FIG. 12 illustrates the same version of the instant invention as presented in FIGS. 10 and 11 but with high aerodynamic efficiency sidewings added. The dotted lines show the sidewings in their folded up orientation for docking.

FIG. 15 is a cross sectional view, as taken through line 15—15 of FIG. 14, that shows details of one of the sidehulls. Things to note are the gas cushion recess and the blower used to supply pressurized gas to that recess and the air inlets located in the topside of the wing shaped main body.

FIG. 16 presents a cross sectional view, as taken through lie 16—16 of FIG. 14, that shows a section of the main wing body. An optional, movable in relation to the hull structure, seal member is shown on the underside toward the aft end of the main wing body. The purpose of this, preferably flexible, movable seal member is to restrict airflow thereby maintaining a high pressure on the underside of the main wing. It is designed to be at least mostly clear of the water during calm sea operation. The reason that it is movable and/or flexible is to reduce the impact loads when it is hit by waves.

DETAILED DESCRIPTION

Figure 1:
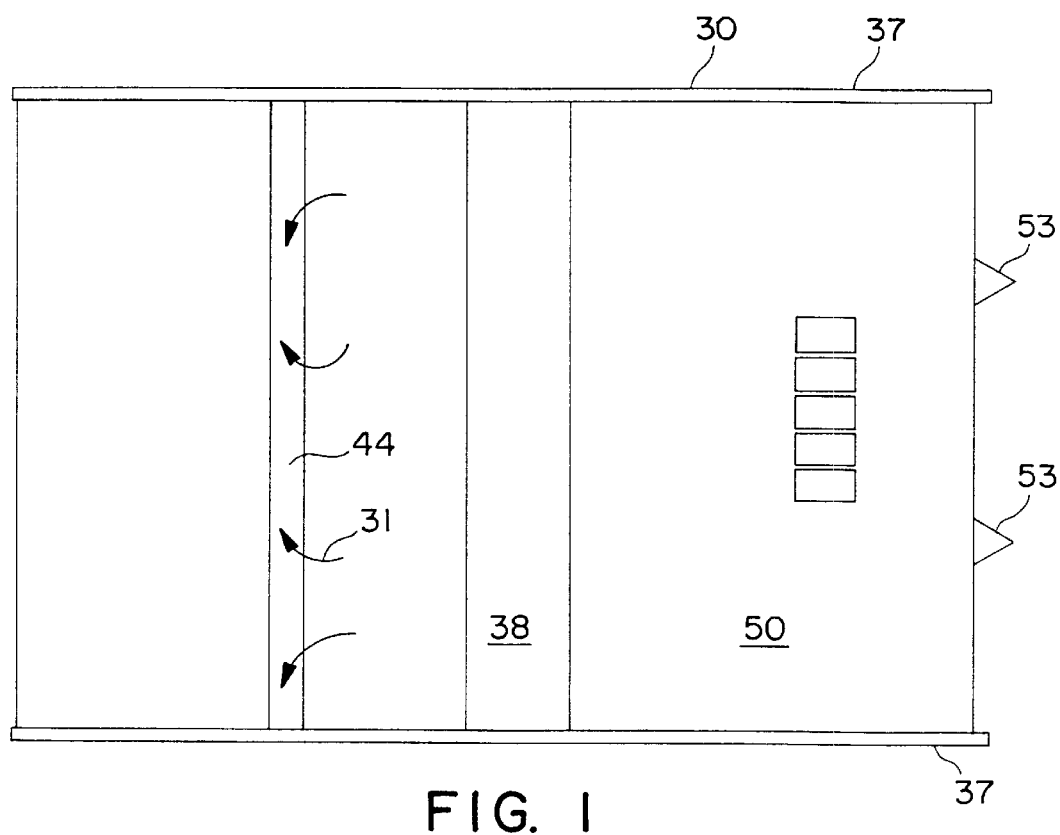
FIG. 1 presents a top plan view of the instant invention improved marine vehicle.
Figure 10:
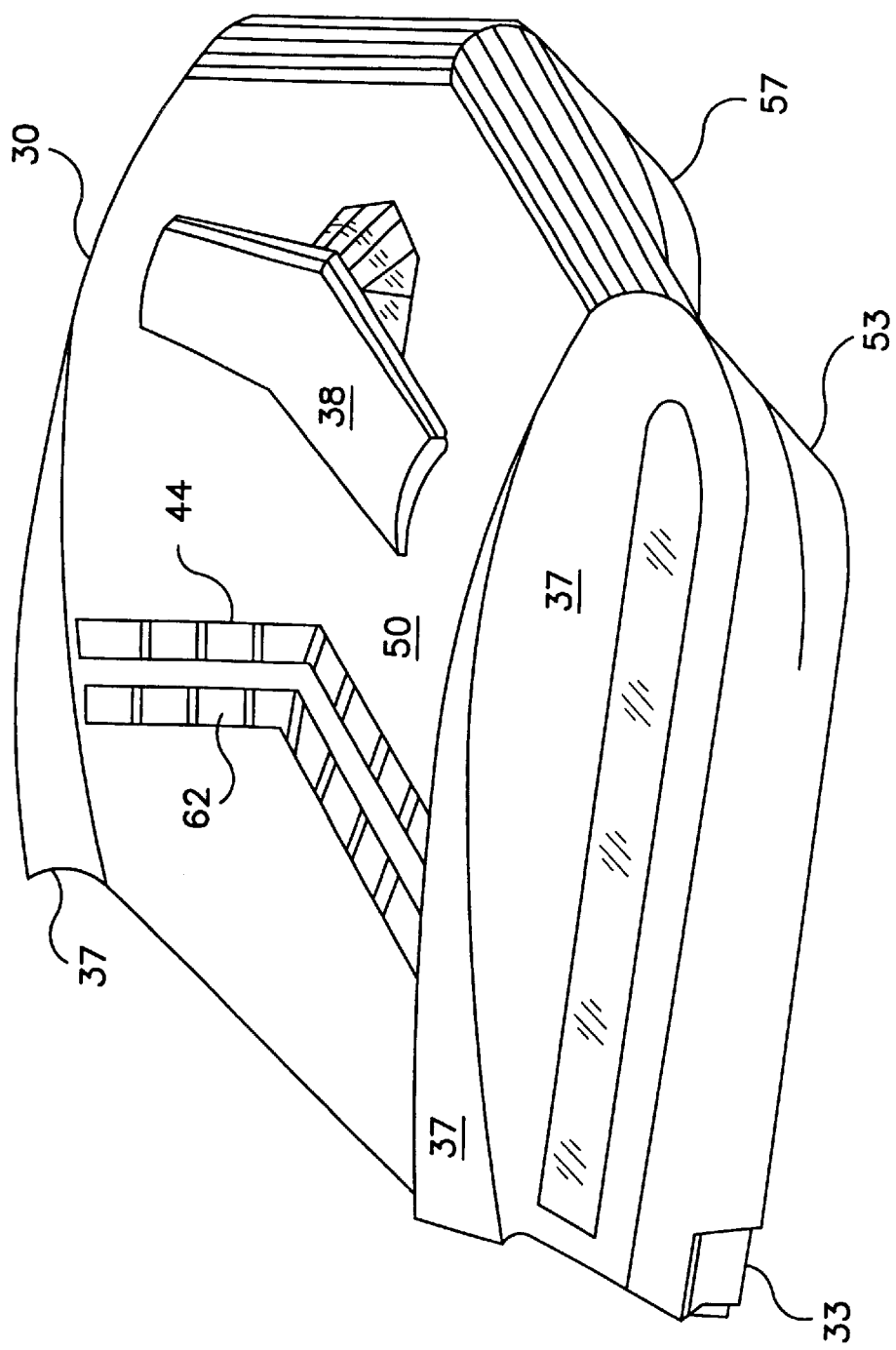
FIG. 10 presents an isometric topside view of a preferred embodiment of the instant invention that has a center hull in addition to sidehulls. Note the generally transversely oriented air inlet openings in the upper surface of the winglike main hull. Note also the secondary airflow directing wing disposed above the pilothouse.

FIG. 1 presents a top plan view of the instant invention marine vehicle 30. Shown are supporting hull(s) 53, wing like connecting structure 50 that also serves as a cabin in this case and can be referred to as a first or main wing, sideplates 37, air directing secondary wing 38, gas flow arrows 31, and a boundary layer control opening 44. The boundary layer control is used to aid in accelerating airflow over the top of the first or main wing to thereby reduce static pressure and improve lift. In this case or illustration, the boundary lay control opening 44 is a simple transversely oriented slot. Refer to FIG. 10 and its description for alternative air inlet configurations that include multiple air inlet openings.

FIG. 2 is a side view of the instant invention marine vehicle 30 that also shows sidesteps 45, and aft water avoiding step inset 39, propulsor 33, hull recess sidekeel 34, hull chine 35, hull stem 36, and waterline 40. Note the use of labels A and B. Their significance will be discussed in the detailed description of FIG. 5 following.

FIG. 3 gives a bow view of the marine vehicle 30 that, in addition to items defined before, shows a wetdeck 43. In this case the wetdeck 43 is the lower surface of the main hull 50.

FIG. 4 is a partial stem view of the marine vehicle 30.

Figure 5:
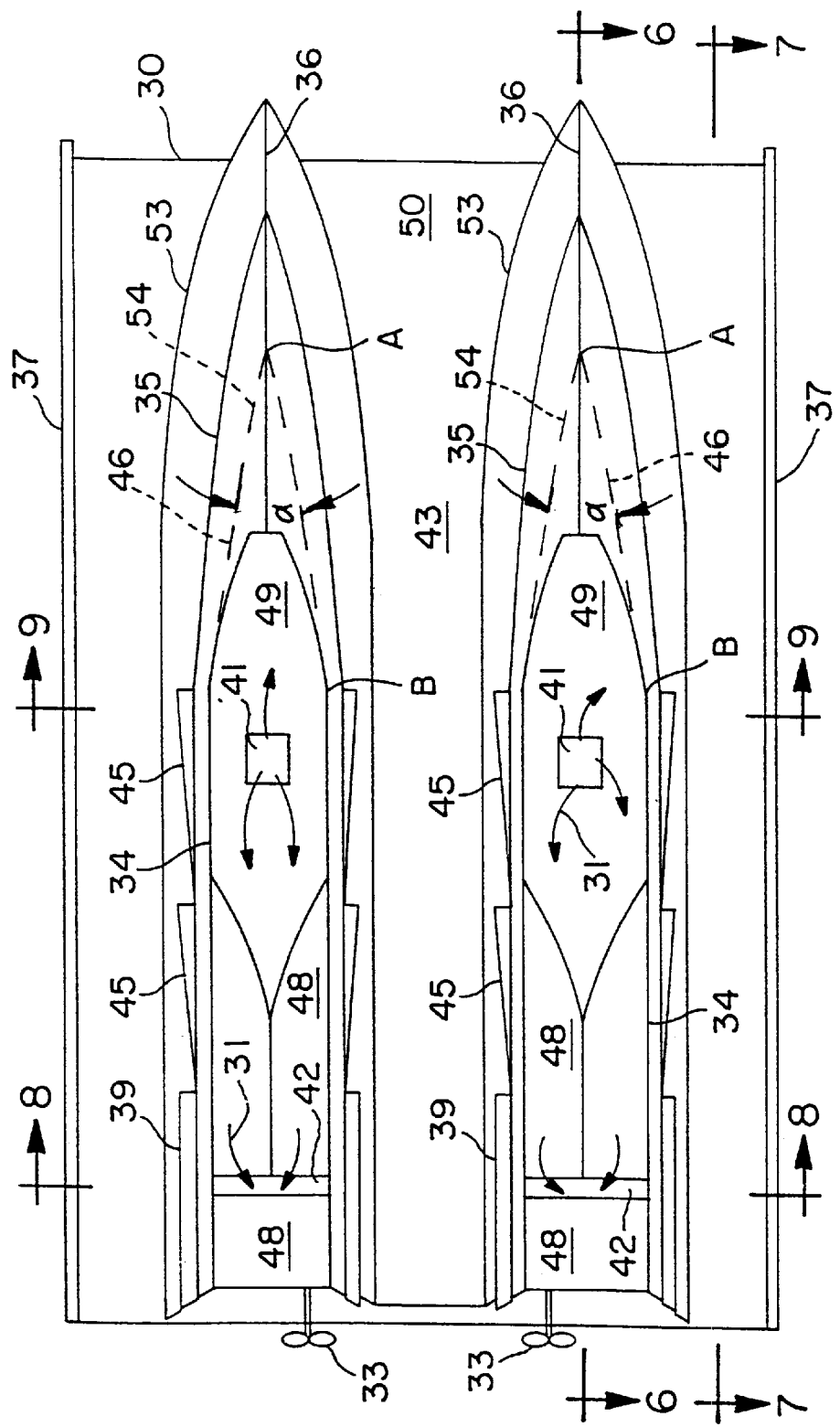
FIG. 5 is a bottom plan view of the instant invention improved marine vehicle.

FIG. 5 presents a bottom plan view of the marine vehicle 30. Items shown, in addition to previously noted items, include hull gas cushion recesses 49, blower discharge openings 41, recess aft seals 48, and recess aft seal openings 42. Note that the recess sidekeels 34 start to converge going from aft to forward at a point B. This convergence is extrapolated, as shown by extrapolation lies 54, to a point A that is the furthermost forward water contacting point of a hull 53 as seen in a calm sea surface waterline with the gas cushion recess(es) 49 not pressurized. Referring back to FIG. 2, it can be realized that point B on the sidekeel(s) can be well underwater while point A is at the waterline. The included angle ($\alpha$) formed between the extrapolated lines connecting points B and A is defined as being less than 26 degrees with less than 22 degrees defined as being best for good rough water ride quality performance. It is also best, from a ride quality standpoint, that such convergence occur over at least one quarter of a waterline length of said hull 53.

Figure 6:
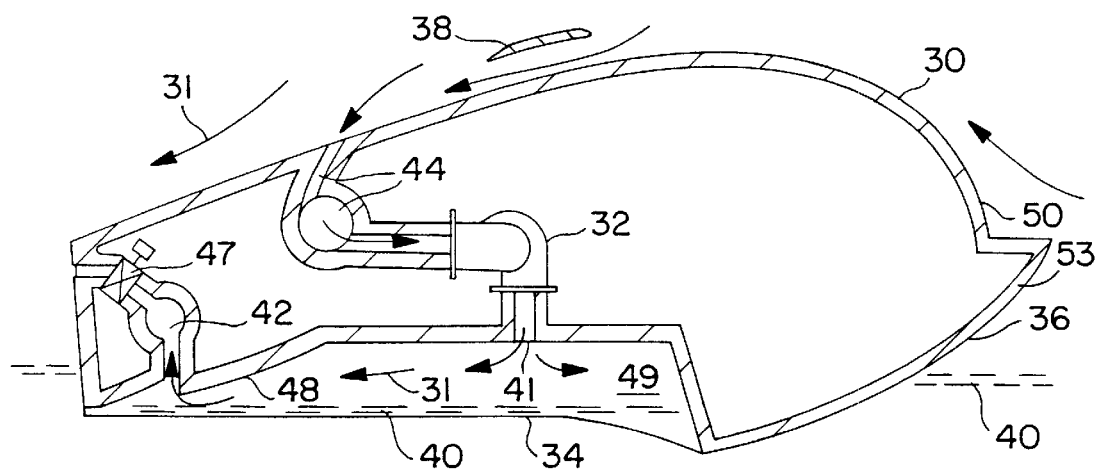
FIG. 6 is a longitudinal cross section, as taken through line 6—6 of FIG. 5, that shows, among other items, a gas cushion recess and gas pressurizing blower.

FIG. 6 presents a cross-section, as taken through line 6—6 of FIG. 5, that shows the generally aerodynamic shape of the upper surface of the main hull 50. Note that the blower 32 is receiving its airflow from an opening 44 that passes through an upper surface of the main hull 50. This approach accelerates air velocity over the upper surface and thereby reduces static pressure to create more aerodynamic lift. Also shown is the gas cushion recess seal 48 that includes opening 42 that connects to the outside of the hull 53. This allows bleeding or supplying of extra gas to the area of the seal 48 to thereby increasing sealing effectiveness. A flow control means 47, that can be a valve or pump, can be utilized to control the gas flow.

Figure 7:
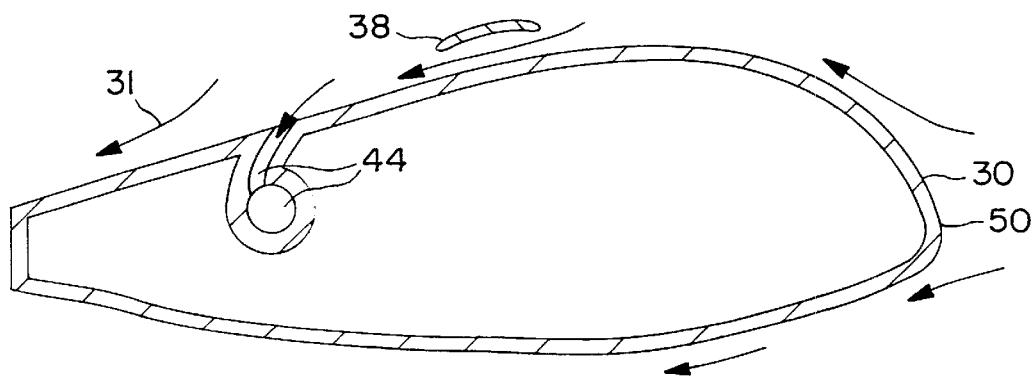
FIG. 7 is a longitudinal cross-section, as taken through line 7—7 of FIG. 5, that shows the preferred shape in that section.

FIG. 7 presents a cross-section, as taken thorough line 7—7 of FIG. 5, that gives a preferred airfoil shape of the connecting or main hull 50. The use of a rather fat or thick profile wing like member is preferred here as that is the most efficient from a high lift coefficient standpoint.

Figure 8:
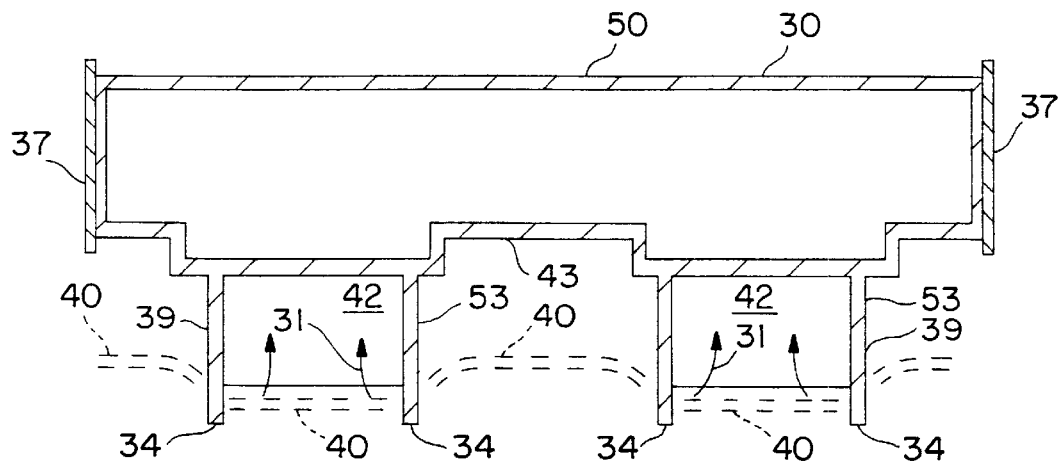
FIG. 8 presents a transverse cross-section, as taken through line 8—8 of FIG. 5, that shows the preferred configuration as taken near the transom.

FIG. 8 is a cross-section, as taken through line 8—8 of FIG. 5, that shows details of the recess seal flow opening 42. The effectiveness of this flow opening is that it tends to change the water level below the seal and thereby reduce gas flow leakage from the gas cushion. The preferred design of the low drag aft step(s) is also shown here.

Figure 9:
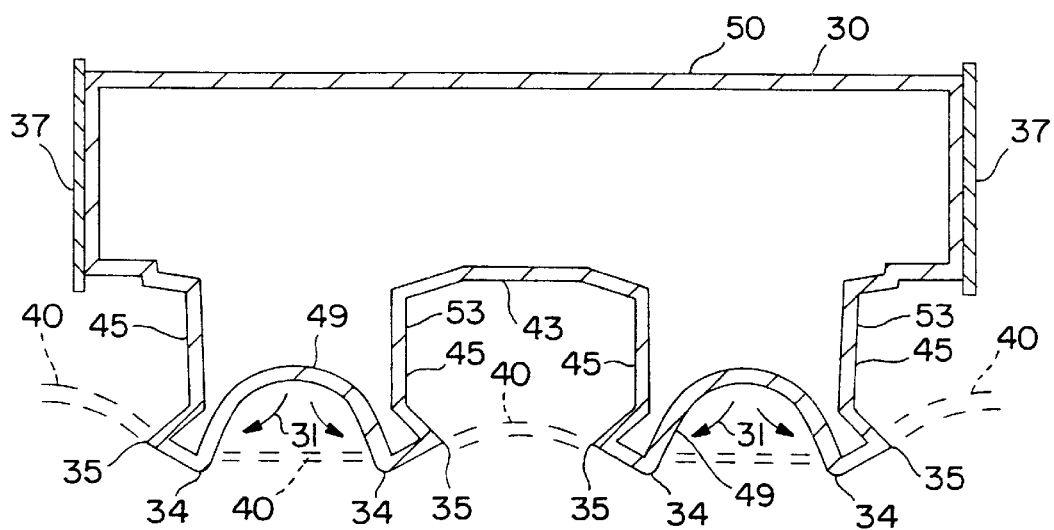
FIG. 9 is a transverse cross-section, as taken through line 9—9 of FIG. 5, that depicts a curvilinear recess upper surface and the preferred shape of the side steps as protected by the hull chines.

FIG. 9 is another cross section, as taken through line 9—9 of FIG. 5, that shows the working of the sidesteps 45 in the hull(s) 53. The condition shown here is for when the hull is running in calm water and/or transiting into a planing mode. Note that the sidesteps 45 would be covered with water when transiting into the planing mode if the chine 35 did not extend outward beyond the sidestep 45—this is very important. The reason for the sidestep(s) 45 is to reduce the amount of water adhering to the side of the hull(s) when operating in rough seas. FIG. 9 also shows the preferred, at least partially, curvilinear upper surface of the gas cushion recess 49. This curvilinear upper surface greatly adds to inherent structural strength of the hull and also adds increased buoyancy when the gas cushions are not pressurized. Note that the recess seal 48, as seen in at least one vertical transverse plane of the hull, is angled to horizontal over a majority of its width between the vertical transverse planes shown in by FIG. 8 and FIG. 9. This angling of recess sealing surfaces greatly enhances rough water ride qualities.

FIG. 10 presents a topside isometric view of the instant invention air assisted ship. Additional items beyond those shown in the previous figures include a center hull 57 and a second boundary layer air inlet 62. Note that the air inlets 44, 62 are made up of a number of openings rather than a slot as shown in FIG. 1. While still transversely oriented, they are optionally angled as they extend in transverse directions in this instance. Note that the sideplates 37 extend upward more extensively beyond the main hull upper surface as they extend aft. This helps hold in and direct the air flow over the upper surface of the main hull.

FIG. 11 is a bow view of the instant invention version shown in FIG. 10.

FIG. 12 presents a bow view of the same instant invention shown in FIG. 10 but with the addition of sidewings 55. The sidewings include winglets 56 that add to the sidewing's efficiency especially when operating close to a water surface 40. When designed to be retractable, the sidewings 55 can fold upward out of the way when docking as indicated by their dashed line outlines.

Figure 13:
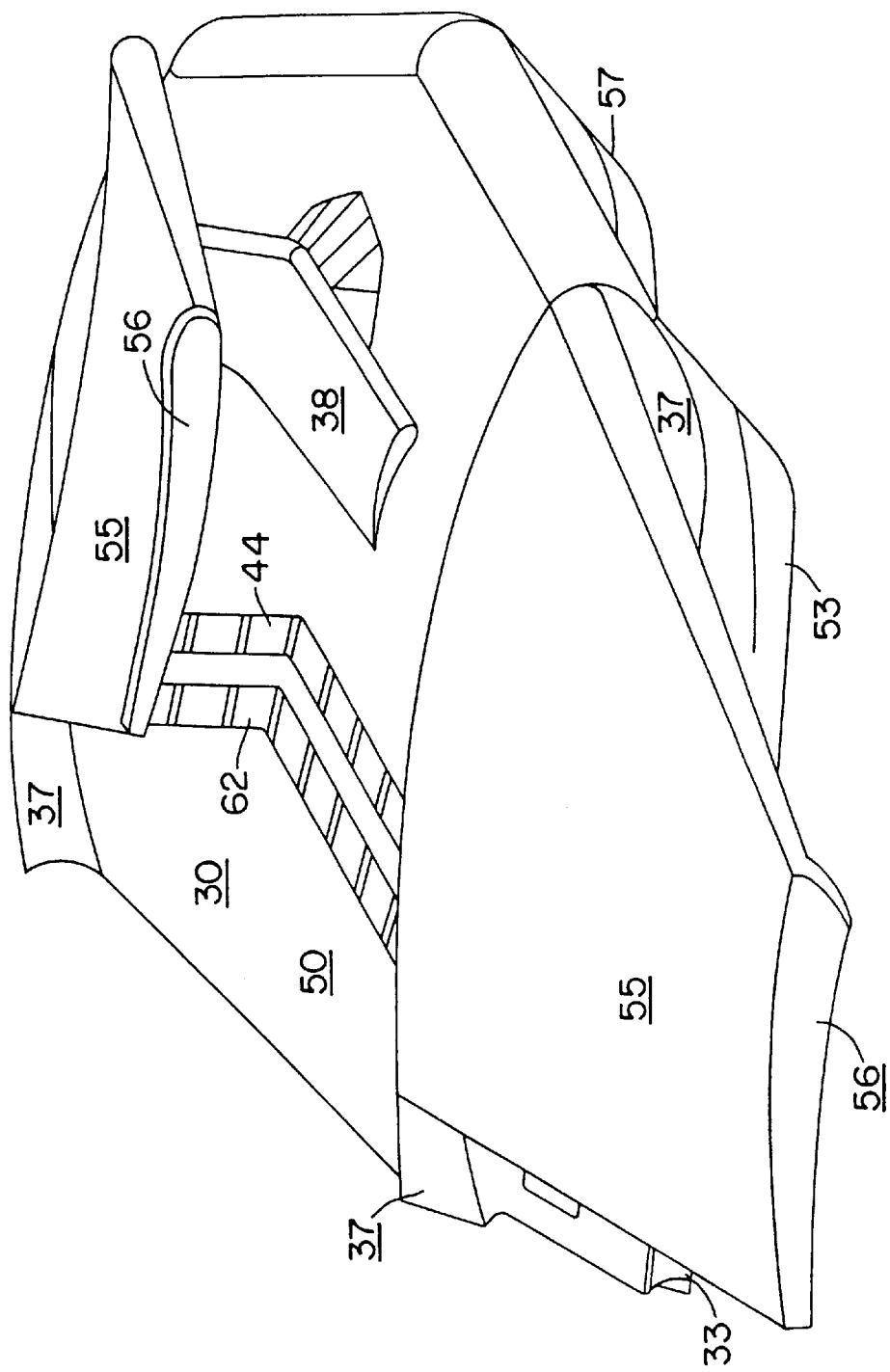
FIG. 13 presents a topside isometric view of the version of the invention given in FIG. 12 that, for illustrative purposes, shows the starboard sidewing extended and the port sidewing folded up as it would be for docking.

FIG. 13 gives the same isometric view of the instant invention as presented in FIG. 10 but with the optional sidewings 55 installed. The starboard sidewing is locked in its lowered position for high speed operation and the port sidewing is folded upward for docking in this illustration.

Figure 14:
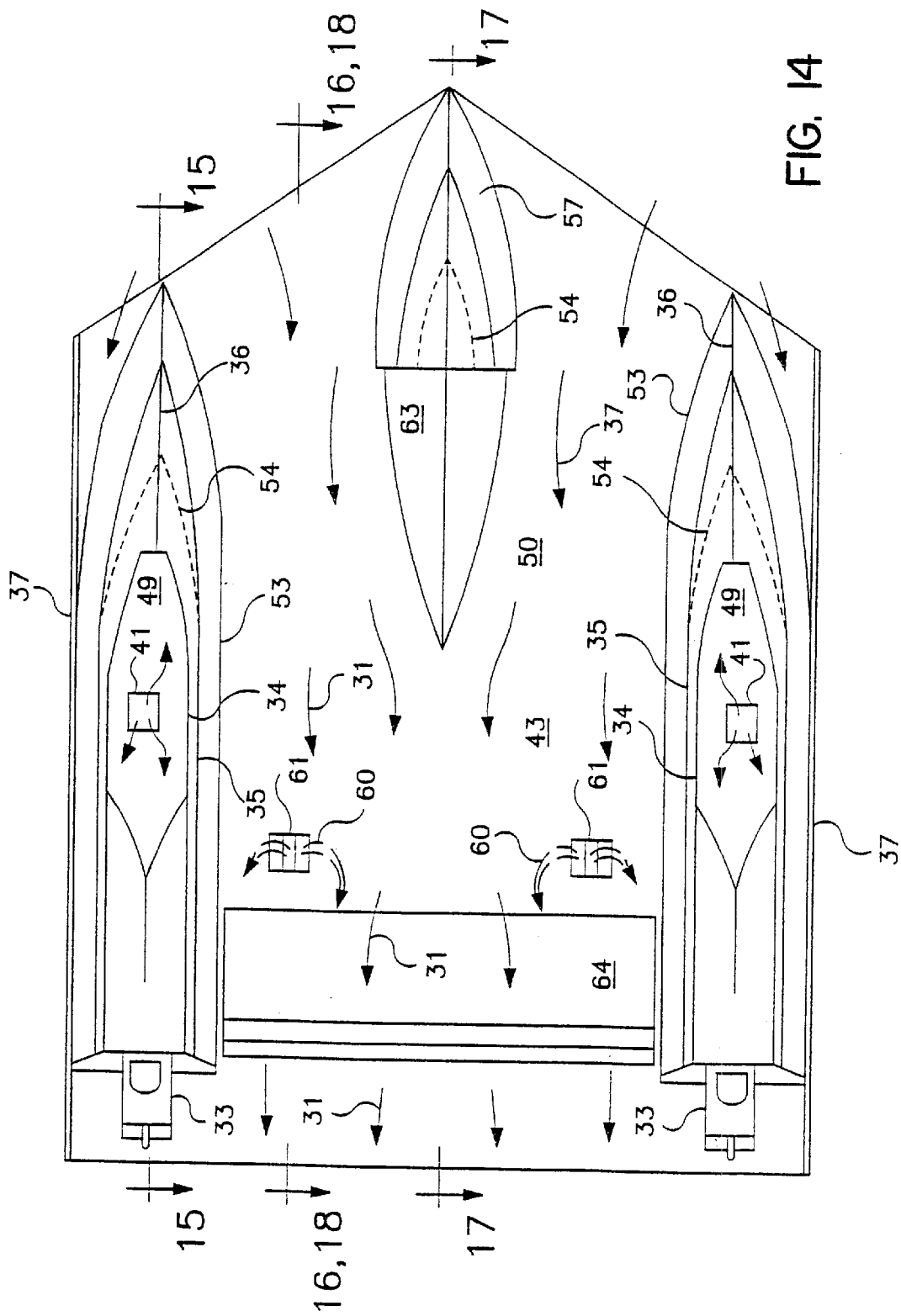
FIG. 14 is a bottom plan view of the version of the instant invention given in FIGS. 10 and 11.

FIG. 14 presents a bottom plan view of the inventive air assisted ship shown in FIG. 10. Note that the forward or center bow 57 has an aft section 63 that steps and then tapers inward over its aft portion 63 to reduce wetted area resistance. Other items to note are air flow arrows 37, engine exhaust flow arrows 60 and engine exhaust flow openings 61. A moveable in relation to the hull aft gas restriction seal 64 is also shown. In its preferred embodiment, that seal 64 is made of flexible material so that it gives to reduce any wave impact forces that are transmitted to the hull. That seal 64 would be, in its preferred embodiment, a gas filled membrane.

It is important to realize that any number of hulls such as the sidehulls 53 and the abbreviated supporting center hull 54 shown here can be employed in the instant invention. It is possible that a center hull could be similar in configuration to the supporting sidehulls shown here with a gas cushion recess pressurized with gas in its underside. In summary, the instant invention can have any number of supporting hulls. In the preferred embodiment of the instant invention, at least one of the supporting hulls incorporates a blower pressurized supporting gas cushion at least partially confined by a recess built into the supporting hull.

FIG. 15 is a cross sectional view, as taken through line 15—15 of FIG. 14, that shows a centerline section through a sidehull 53. Items shown include a gas cushion pressurizing blower 32, blower air inlet 44, gas turbine propulsor engine 58, propulsor engine air inlet 62, and propulsor engine exhaust duct 61. The propulsor water drive 33 in this instance is an enclosed waterjet rather than an open water propeller as was shown in FIGS. 4 and 5.

FIG. 16 is a cross sectional view, as taken through fine 16—16 of FIG. 14, that shows a cross section of the main wing 50 and a second wing 38. A cross section of a typical aft seal 64 that is moveable in relation to the main hull 50 is also shown. That aft seal is preferably flexible to reduce the effect of wave impacts.

Figure 17:
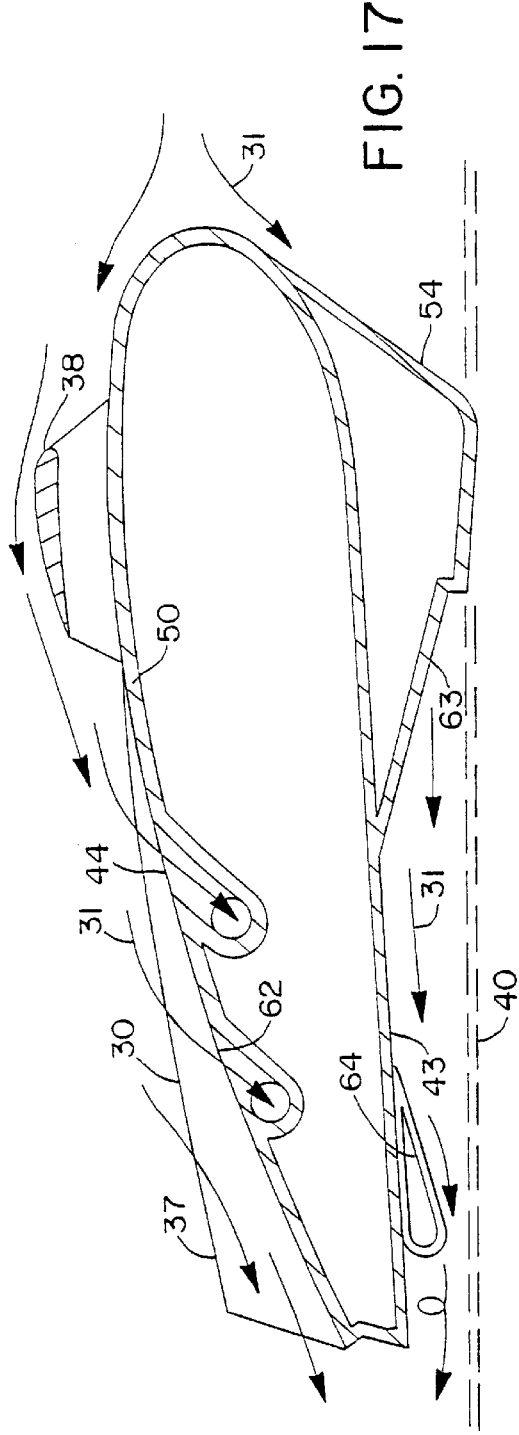
FIG. 17 is a centerline cross sectional view, as taken through line 17—17 of FIG. 14, that shows a forward center hull with a step to allow water separation going aft.

FIG. 17 is yet another cross sectional view, as taken through line 17—17 of FIG. 14, that shows a vertical transverse plane through the centerline of the main wing 50. This shows a section through a forward bow 54 and that bow's stepped-in aft section 63.

Figure 18:
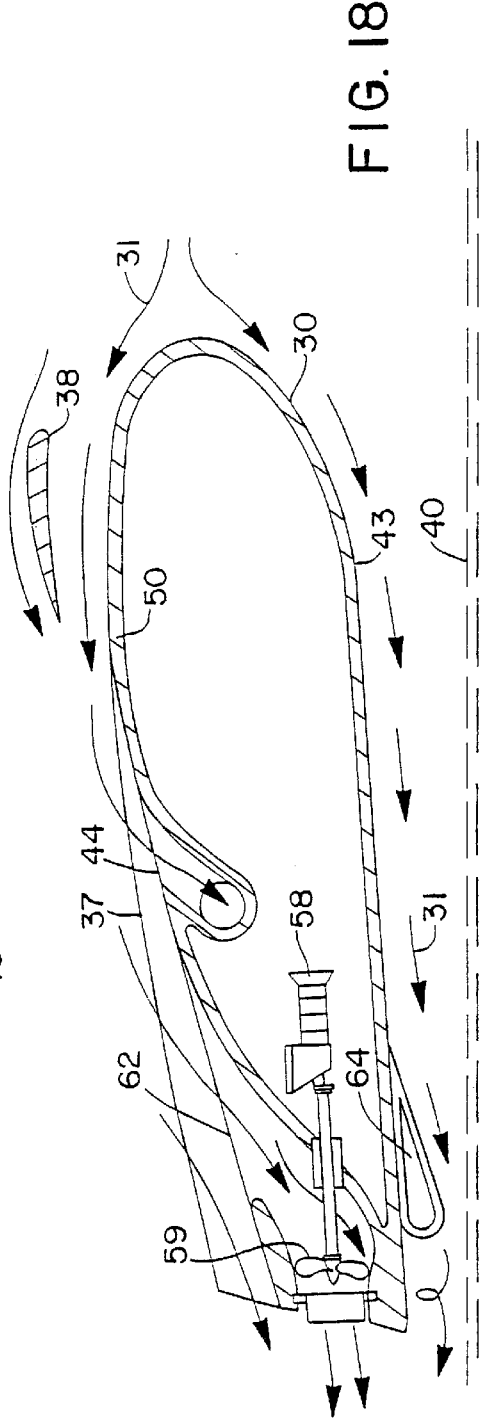
FIG. 18 presents an alternative cross sectional view, as taken though line 18—18 of FIG. 14, where an air propulsor is utilized for propulsion. Note that the air inlet for this alternative air propulsor is located in the upper surface of the main wing to thereby aid in boundary flow control across the top of the main wing. It is to be realized that use of an air propulsor such as shown here allows the instant invention to transition to an airborne vehicle that operates in a wing in ground effect mode.

FIG. 18 presents a cross sectional view of an optional air propulsor 59, as taken through line 18—18 of FIG. 14. The advantages of this air propulsor(s) 59 are that the instant invention air assisted ship can transition to an airborne flight mode. Note that the air propulsor's air inlet 62 is acting as a boundary layer flow control means here.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved marine vehicle with at least two supporting hulls having gas cushion recesses built into their undersides, said supporting hulls in mechanical communication by means of connecting hull structure, said gas cushion recesses acting to restrain pressurized gas cushions formed when pressurized gas is supplied to said pressurized gas cushions by artificial gas pressurization means when the improved marine vehicle is waterborne, the improvement comprising:

said recesses at least partially defined by recess aft gas cushion seals and sidekeels, said connecting hull structure at least in part airfoil shaped with an upper surface that is, on average as seen in a longitudinal cross section, curvilinear and thicker at its longitudinal midpoint than its aft portions, and at least portions of gas supplied to said artificial gas pressurization means is obtained from one or more transversely oriented gas openings in upper surfaces of said connecting hull structure whereby said transversely oriented gas openings are, at least in their majority, positioned aft of said longitudinal mid-point of said connecting hull structure.

2. The improved marine vehicle of claim 1 wherein said gas cushion recesses, as seen in a calm sea waterline with the gas cushion pressurized with gas, are more narrow forward than midship.

3. The improved marine vehicle of claim 1 wherein there are vertically oriented recesses inset into outside surfaces of the supporting hulls.

4. The improved marine vehicle of claim 1 which further comprises an air directing wing disposed above surfaces of said connecting hull structure.

5. The improved marine vehicle of claim 4 wherein said transversely oriented gas openings are at least in their majority disposed aft of said air directing wing.

6. The improved marine vehicle of claim 1 wherein gas entering said transversely oriented gas openings in upper surfaces of said connecting hull structure act as air flow boundary layer control means.

7. The improved marine vehicle of claim 1 which further comprises one or more transversely oriented gas openings in upper surfaces of said connecting hull structure wherein said gas opening supplies gas to a propulsor engine.

8. The improved marine vehicle of claim 1 which further comprises one or more transversely oriented gas openings in upper surfaces of said connecting hull structure wherein said gas opening supplies gas to an air propulsor.

9. The improved marine vehicle of claim 1 wherein said connecting hull structure includes sideplates.

10. The improved marine vehicle of claim 1 which further comprises sidewings.

11. The improved marine vehicle of claim 10 wherein said sidewings are retractable.

12. The improved marine vehicle of claim 10 wherein said sidewings are in mechanical communication with winglets proximal their outer ends.

13. The improved marine vehicle of claim 1 which further comprises a moveable in relation to the marine vehicle seal member on the underside of the connecting hull structure.

14. In an improved marine vehicle with at least two supporting hulls having gas cushion recesses built into their undersides, said supporting hulls in mechanical communication by means of connecting hull structure, said gas cushion recesses acting to restrain pressurized gas cushions formed when pressurized gas is supplied to said pressurized gas cushions by artificial gas pressurization means when the improved marine vehicle is waterborne, the improvement comprising:

said recesses at least partially defined by recess aft gas cushion seals and sidekeels, said connecting hull structure at least in part airfoil shaped with an upper surface that is, on average as seen m a longitudinal cross section, curvilinear and thicker at its longitudinal mid-point than its aft portions, and an air directing wing disposed above surfaces of said connecting hull structure and wherein at least portions of gas supplied to said artificial gas pressurization means is obtained from one or more transversely oriented gas openings in upper surfaces of said connecting hull structure whereby said transversely oriented gas openings are, at least in their majority, positioned aft of said longitudinal mid-point of said connecting hull structure.

15. The improved marine vehicle of claim 14 wherein said gas cushion recesses, as seen in a calm sea waterline with the gas cushion pressurized with gas, are more narrow forward than aft.

16. The improved marine vehicle of claim 14 wherein there are vertically oriented recesses inset into outside surfaces of the supporting hulls.

17. The improved marine vehicle of claim 14 wherein said transversely oriented gas openings are at least in their majority disposed aft of said air directing wing.

18. The improved marine vehicle of claim 14 wherein gas entering said transversely oriented gas openings in upper surfaces of said connecting hull structure act as air flow boundary layer control means.

19. The improved marine vehicle of claim 14 which further comprises one or more transversely oriented gas openings in upper surfaces of said connecting hull structure wherein said gas opening supplies gas to a propulsor engine.

20. The improved marine vehicle of claim 14 which further comprises one or more transversely oriented gas openings in upper surfaces of said connecting hull structure wherein said gas opening supplies gas to an air propulsor.

21. The improved marine vehicle of claim 14 wherein said connecting hull structure includes sideplates.

22. The improved marine vehicle of claim 14 which further comprises sidewings.

23. The improved marine vehicle of claim 22 wherein said sidewings are retractable.

24. The improved marine vehicle of claim 22 wherein said sidewings are in mechanical communication with winglets proximal their outer ends.

25. The improved marine vehicle of claim 14 which further comprises a moveable in relation to the marine vehicle seal member on the underside of the connecting hull structure.

26. In an improved marine vehicle with at least two supporting hulls having gas cushion recesses built into their undersides, said supporting hulls in mechanical communication by means of connecting hull structure, said gas cushion recesses acting to restrain pressurized gas cushions formed when pressurized gas is supplied to said pressurized gas cushions by artificial gas pressurization means when the improved marine vehicle is waterborne, the improvement comprising:

said gas cushion recesses at least partially defined by recess aft gas cushion seals and sidekeels, said connecting hull structure at least in part airfoil shaped with an upper surface that is, on average as seen in a longitudinal cross section, curvilinear and thicker at its longitudinal mid-point than its aft portions, and wherein which further comprises one or more transversely oriented gas openings in upper surfaces of said connecting hull structure wherein said gas opening supplies gas to an air propulsor.

27. The improved marine vehicle of claim 26 which further comprises an air directing wing disposed above surfaces of said connecting hull structure.

28. The improved marine vehicle of claim 26 wherein said gas cushion recesses, as seen in a calm sea waterline with the gas cushion pressurized with gas, are more narrow forward than midship.

29. The improved marine vehicle of claim 26 wherein there are vertically oriented recesses inset into outside surfaces of the supporting hulls.

30. The improved marine vehicle of claim 26 wherein at least portions of gas supplied to said artificial gas pressurization means is obtained from one or more transversely oriented gas openings in upper surfaces of said connecting hull structure whereby said transversely oriented gas openings are, at least in their majority, positioned aft of said longitudinal mid-point of said connecting hull structure.

31. The improved marine vehicle of claim 30 wherein said transversely oriented gas openings are at least in their majority disposed aft of an air directing wing.

32. The improved marine vehicle of claim 30 wherein gas entering said transversely oriented gas openings in upper surfaces of said connecting hull structure act as air flow boundary layer control means.

33. The improved marine vehicle of claim 26 which further comprises one or more transversely oriented gas openings in upper surfaces of said connecting hull structure wherein said gas opening supplies gas to a propulsor engine.

34. The improved marine vehicle of claim 26 wherein said connecting hull structure includes sideplates wherein said sideplates, at least over a majority of an upper aft portion of said connecting hull structure, extend upward beyond adjacent surfaces of the connecting hull structure.

35. The improved marine vehicle of claim 26 which further comprises sidewings.

36. The improved marine vehicle of claim 35 wherein said sidewings are retractable.

37. The improved marine vehicle of claim 35 wherein said sidewings are in mechanical communication with winglets proximal their outer ends.

38. The improved marine vehicle of claim 26 which further comprises a moveable in relation to the marine vehicle seal member on the underside of the connecting hull structure.

39. In an improved marine vehicle with at least two supporting hulls having gas cushion recesses built into their undersides, said supporting hulls in mechanical communication by means of connecting hull structure, said gas cushion recesses acting to restrain pressurized gas cushions formed when pressurized gas is supplied to said pressurized gas cushions by artificial gas pressurization means when the improved marine vehicle is waterborne, the improvement comprising:

said gas cushion recesses at least partially defined by recess aft gas cushion seals and sidekeels, said connecting hull structure at least in part airfoil shaped with an upper surface that is, on average as seen in a longitudinal cross section, curvilinear and thicker at its longitudinal mid-point than its aft portions, and wherein there are vertically oriented recesses inset into outside surfaces of the supporting hulls.

40. The improved marine vehicle of claim 39 which further comprises an air directing wing disposed above surfaces of said connecting hull structure.

41. The improved marine vehicle of claim 39 wherein said gas cushion recesses, as seen in a calm sea waterline with the gas cushion pressurized with gas, are more narrow forward than midship.

42. The improved marine vehicle of claim 39 which further includes sidewings.

43. The improved marine vehicle of claim 42 wherein said sidewings are retractable.

44. The improved marine vehicle of claim 42 wherein said sidewings are in mechanical communication with winglets proximal their outer ends.

45. The improved marine vehicle of claim 39 wherein at least portions of gas supplied to said artificial gas pressurization means is obtained from one or more transversely oriented gas openings in upper surfaces of said connecting hull structure whereby said transversely oriented gas openings are, at least in their majority, positioned aft of said longitudinal mid-point of said connecting hull structure.

46. The improved marine vehicle of claim 45 wherein said transversely oriented gas openings are at least in their majority disposed aft fan air directing wing.

47. The improved marine vehicle of claim 45 wherein gas entering said transversely oriented gas openings in upper surfaces of said connecting hull structure act as air flow boundary layer control means.

48. The improved marine vehicle of claim 39 which further comprises one or more transversely oriented gas openings in upper surfaces of said connecting hull structure wherein said gas opening supplies gas to a propulsor engine.

49. The improved marine vehicle of claim 39 which further comprises one or more transversely oriented gas openings in upper surfaces of said connecting hull structure wherein said gas opening supplies gas to an air propulsor.

50. The improved marine vehicle of claim 39 which further comprises a moveable in relation to the marine vehicle seal member on the underside of the connecting hull structure.

* * * * *